(12) United States Patent
August et al.

(10) Patent No.: US 10,633,229 B2
(45) Date of Patent: Apr. 28, 2020

(54) WINCH WITH INTEGRATED LIGHTING, AND ASSOCIATED SYSTEMS AND METHODS

(71) Applicant: Westin Automotive Products, Inc., San Dimas, CA (US)

(72) Inventors: Jacob August, Sherwood, OR (US); Ron Dennis, Woodburn, OR (US); Timothy Frazier, Beaverton, OR (US); Jon Mason, Old Saybrook, CT (US); Scott Salmon, Dayville, CT (US); Ty Hargroder, Los Angeles, CA (US); David Scuito, Molalla, OR (US); David Burns, Wilsonville, OR (US); Brent Nasset, Salem, OR (US)

(73) Assignee: Westin Automotive Products, Inc., San Dimas, CA (US)

( * ) Notice: Subject to any disclaimer, the term of this patent is extended or adjusted under 35 U.S.C. 154(b) by 267 days.

(21) Appl. No.: 15/724,756

(22) Filed: Oct. 4, 2017

(65) Prior Publication Data

US 2018/0118530 A1    May 3, 2018

Related U.S. Application Data

(60) Provisional application No. 62/405,154, filed on Oct. 6, 2016.

(51) Int. Cl.
*B66D 1/18* (2006.01)
*B66D 1/00* (2006.01)
(Continued)

(52) U.S. Cl.
CPC ............... *B66D 1/18* (2013.01); *B66D 1/005* (2013.01); *B66D 1/12* (2013.01); *B66D 1/28* (2013.01); *B66D 1/36* (2013.01); *F21V 23/002* (2013.01); *G02B 6/426* (2013.01); *H01P 1/005* (2013.01); *G02B 6/0011* (2013.01)

(58) Field of Classification Search
CPC . B66D 1/005; B66D 1/18; B66D 1/36; B66D 1/12; F12V 23/002; G02B 6/0011; H01P 1/005
See application file for complete search history.

(56) References Cited

U.S. PATENT DOCUMENTS

| 4,004,780 A | 1/1977 | Kuzarov |
| 4,475,163 A | 10/1984 | Chandler et al. |

(Continued)

OTHER PUBLICATIONS

U.S. Appl. No. 14/735,674, filed Jun. 10, 2015, Mason.
(Continued)

*Primary Examiner* — Emmanuel M Marcelo
(74) *Attorney, Agent, or Firm* — The Dobrusin Law Firm, PC

(57) ABSTRACT

Winches with integrated lighting, and associated systems and methods are disclosed. A representative winch with integrated lighting can include a frame, a cable drum rotatably supported by the frame, a drive motor operatively connected to the cable drum, and an electrical module. The electrical module can include a housing with first and second end caps coupled to the housing. An elongate light guide can be mounted to the housing between the housing and the cable drum with one or more drum light sources connected to the elongate light guide.

24 Claims, 9 Drawing Sheets

(51) Int. Cl.
*G02B 6/42* (2006.01)
*F21V 23/00* (2015.01)
*B66D 1/36* (2006.01)
*H01P 1/00* (2006.01)
*B66D 1/28* (2006.01)
*B66D 1/12* (2006.01)
*F21V 8/00* (2006.01)

(56) References Cited

U.S. PATENT DOCUMENTS

| | | | |
|---|---|---|---|
| 5,982,138 A * | 11/1999 | Krieger | H02J 7/0065 320/104 |
| 5,995,347 A | 11/1999 | Rudd et al. | |
| D471,338 S | 3/2003 | Hodge | |
| 6,636,015 B1 * | 10/2003 | Levine | H01M 2/1072 320/104 |
| D489,157 S | 4/2004 | Lawson | |
| 6,799,993 B2 * | 10/2004 | Krieger | H01M 2/1005 439/500 |
| 6,864,650 B2 | 3/2005 | Heravi et al. | |
| D513,650 S | 1/2006 | Elliott | |
| 7,063,306 B2 | 6/2006 | Sanders et al. | |
| D532,577 S | 11/2006 | Elliott et al. | |
| 7,148,580 B2 * | 12/2006 | Sodemann | F02N 11/12 290/1 A |
| 7,201,366 B2 | 4/2007 | Sanders et al. | |
| D550,923 S | 9/2007 | Huang | |
| D555,874 S | 11/2007 | Elliott et al. | |
| 7,511,443 B2 | 3/2009 | Townsend et al. | |
| 7,578,598 B2 * | 8/2009 | Robinson | F21S 9/02 362/183 |
| 7,891,641 B1 | 2/2011 | Miller | |
| 8,055,403 B2 | 11/2011 | Lowrey et al. | |
| 8,076,885 B2 | 12/2011 | Heravi et al. | |
| D670,660 S | 11/2012 | Cook | |
| D685,750 S | 7/2013 | Nakagawa | |
| D703,414 S | 4/2014 | Fretz et al. | |
| 9,014,913 B2 | 4/2015 | Heravi et al. | |
| D741,038 S | 10/2015 | Huang | |
| 9,315,364 B2 * | 4/2016 | Averill | B66D 1/16 |
| D766,843 S | 9/2016 | Fretz et al. | |
| D784,934 S | 4/2017 | Fretz et al. | |
| D799,144 S | 10/2017 | Cui | |
| 10,027,154 B2 * | 7/2018 | Chiu | H02J 7/0047 |
| 2002/0156574 A1 | 10/2002 | Fortin | |
| 2008/0150473 A1 * | 6/2008 | Wise | H02J 7/0042 320/105 |
| 2008/0166430 A1 | 7/2008 | Doyle et al. | |
| 2009/0242861 A1 * | 10/2009 | Kochan | B66D 1/14 254/293 |
| 2009/0284877 A1 | 11/2009 | Heravi et al. | |
| 2010/0319910 A1 | 12/2010 | Ives et al. | |
| 2011/0065546 A1 | 3/2011 | Xie et al. | |
| 2013/0154821 A1 | 6/2013 | Miller et al. | |
| 2013/0304278 A1 | 11/2013 | Chen | |
| 2014/0001427 A1 | 1/2014 | Fretz et al. | |
| 2014/0139175 A1 * | 5/2014 | Gonzalez | F02N 11/12 320/101 |
| 2014/0257631 A1 * | 9/2014 | Heravi | B66D 1/42 701/36 |
| 2015/0091392 A1 * | 4/2015 | Hwang | H02J 7/0045 307/150 |
| 2015/0191334 A1 | 7/2015 | Heravi et al. | |
| 2016/0046468 A1 | 2/2016 | Heravi et al. | |
| 2016/0311667 A1 | 10/2016 | Huang | |
| 2016/0311668 A1 | 10/2016 | Huang | |
| 2017/0012448 A1 * | 1/2017 | Miller | H02J 7/0031 |
| 2017/0062148 A1 | 3/2017 | Legel | |
| 2017/0320709 A1 | 11/2017 | Frazier et al. | |
| 2017/0321851 A1 * | 11/2017 | Fretz | B63B 21/14 |

OTHER PUBLICATIONS

U.S. Appl. No. 15/640,091, filed Jun. 30, 2017, Dennis.
U.S. Appl. No. 15/722,234, filed Oct. 2, 2017, Karambelas.
U.S. Appl. No. 15/722,396, filed Oct. 2, 2017, August.
U.S. Appl. No. 15/724,652, filed Oct. 4, 2017, August.
U.S. Appl. No. 15/724,853, filed Oct. 4, 2017, August.
U.S. Appl. No. 15/793,451, filed Oct. 25, 2017, August.
U.S. Appl. No. 15/793,544, filed Oct. 25, 2017, August.
U.S. Appl. No. 29/563,917, filed Nov. 14, 2017, August.
U.S. Appl. No. 29/563,921, filed May 9, 2016, Frazier.
U.S. Appl. No. 29/579,766, filed Oct. 3, 2016, August.
"Automotive Winch Intruction Manual," Comeup Industries Inc., http://www.comeup.com/Archive/_eng/all_pdf_eng/Comeup_Automotive_Winch_Instruction_Manual-eng.pdf, Aug. 1, 2013, 22 pages.
Superwinch, "Superwinch SI Industrial Winches," YouTube, https://www.youtube.com/watch?v=bMiDddvCZgs>, accessed Nov. 21, 2016, 1 page.
"The Comeup Cone Brake Structure," Comeup USA, http://comeupusa.com/2017/04/the-comeup-cone-brake-structure/, Apr. 28, 2017, 2 pages.

* cited by examiner

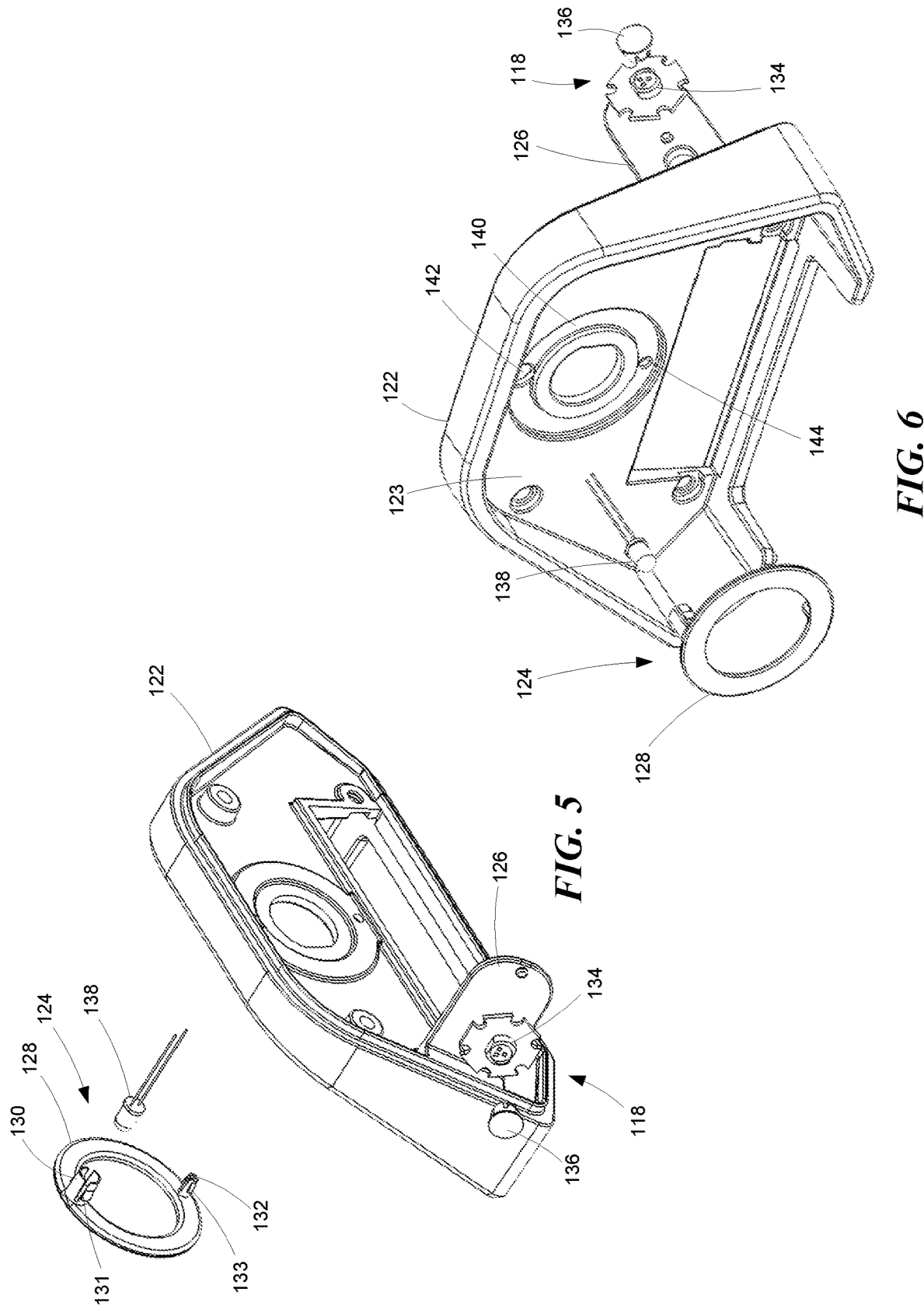

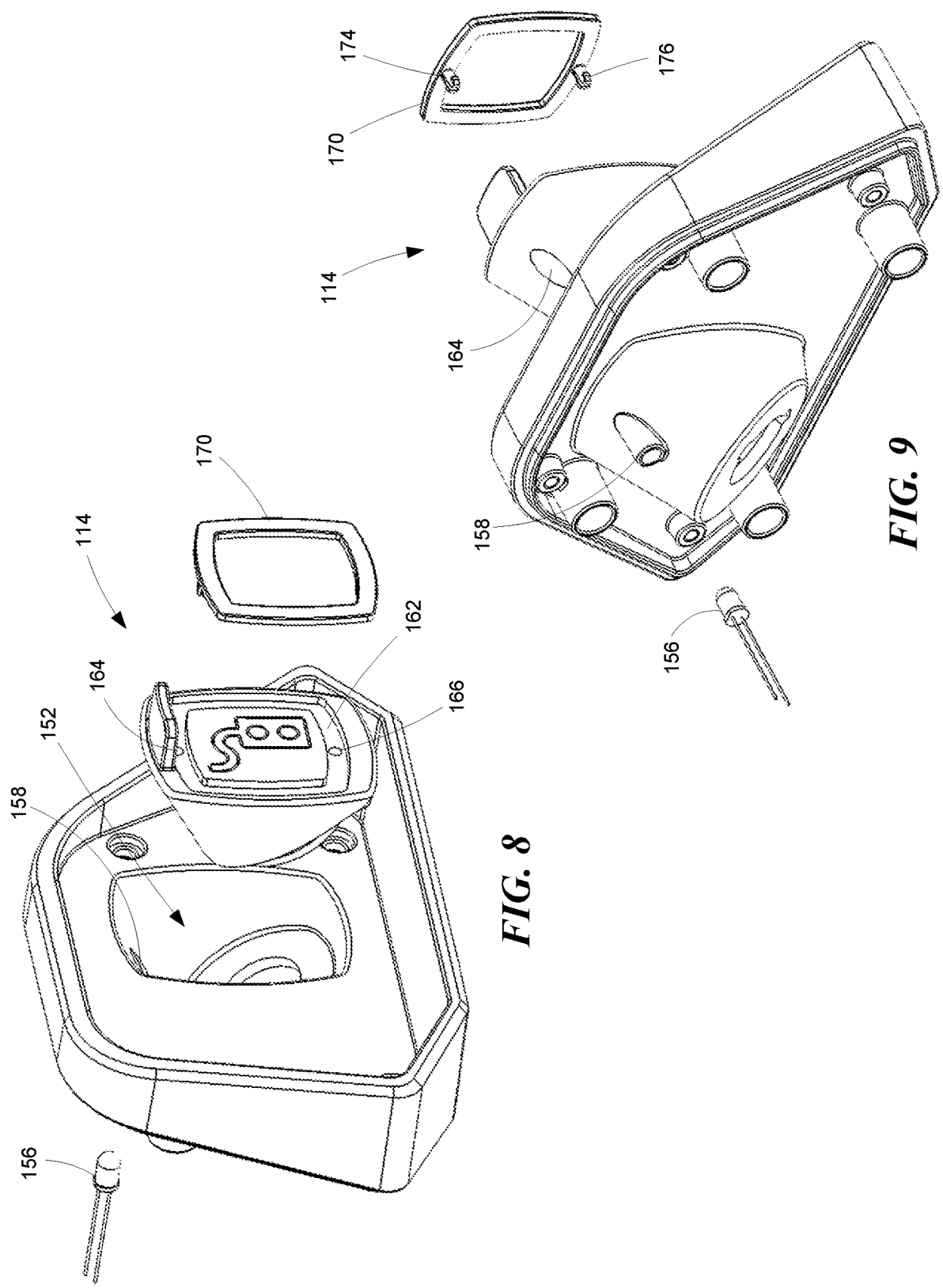

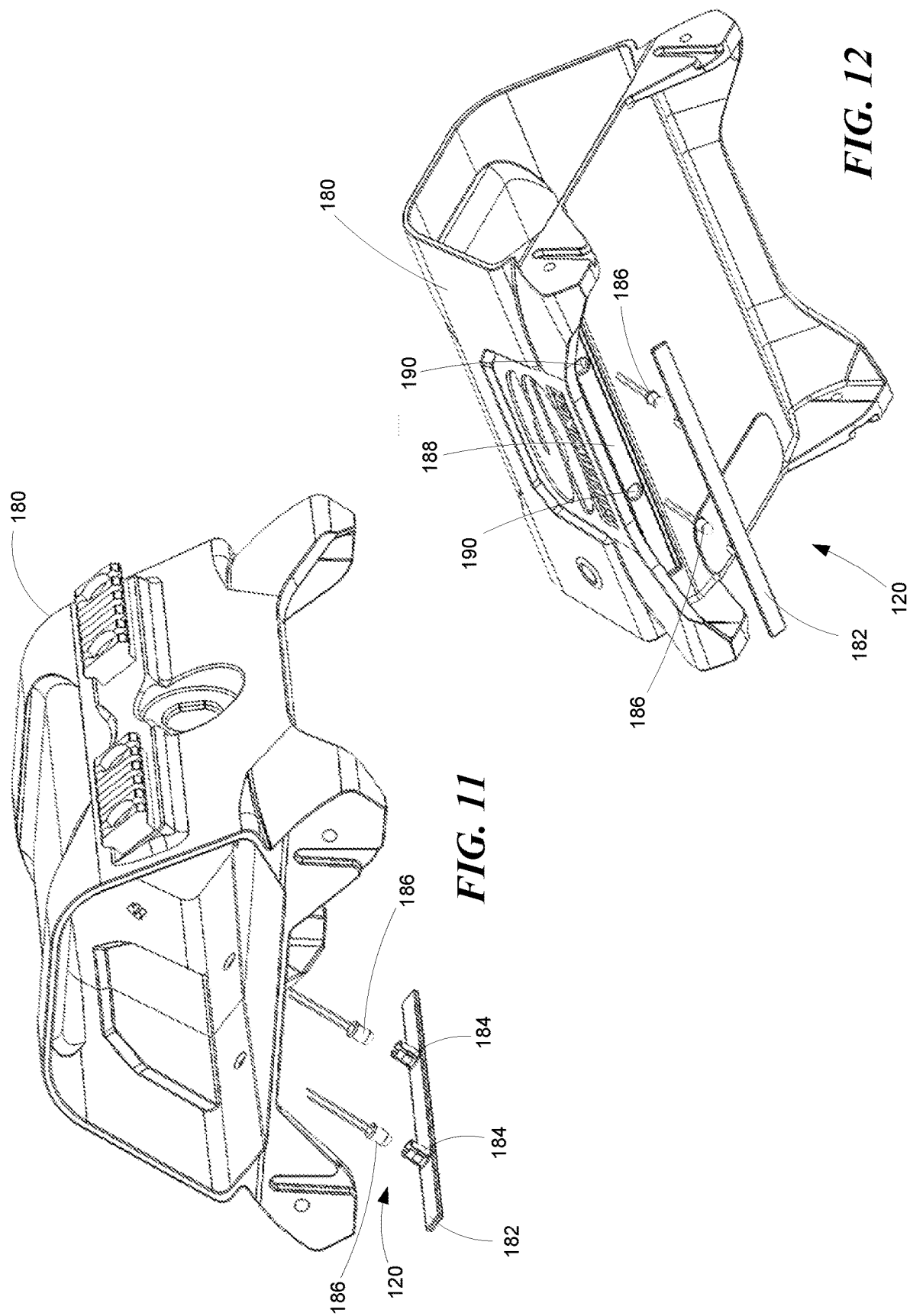

WINCH WITH INTEGRATED LIGHTING, AND ASSOCIATED SYSTEMS AND METHODS

CROSS-REFERENCE TO RELATED APPLICATION

This application claims the benefit of and priority to U.S. Patent Application No. 62/405,154, filed Oct. 6, 2016, the disclosure of which is incorporated herein by reference in its entirety.

TECHNICAL FIELD

This present technology is directed to winches and, more specifically, to winches with integrated lighting, and associated systems and methods.

BACKGROUND

Winches are typically employed in situations where a vehicle is unable to negotiate an obstacle (e.g., mud or rocks) on its own. For example, a winch is typically used to help extract the vehicle and/or to stabilize the vehicle while negotiating steep terrain. As such, winching operations can involve heavy loads. Therefore, an operator should carefully monitor the winch, particularly the cable drum. In low light conditions, it can be especially difficult for the operator to manage the cable or rope as it winds onto the winch drum.

BRIEF DESCRIPTION OF THE DRAWINGS

Embodiments of representative winches with integrated lighting described herein may be better understood by referring to the following Detailed Description in conjunction with the accompanying drawings, in which like reference numerals indicate identical or functionally similar elements:

FIG. 5 is an exploded isometric view of the end cap assembly shown in FIG. 4 as viewed from the back side;

FIG. 6 is an exploded isometric view of the end cap assembly shown in FIG. 4 as viewed from the front side;

FIG. 8 is an exploded isometric view of the end cap assembly shown in FIG. 7 as viewed from the front side;

FIG. 9 is an exploded isometric view of the end cap assembly shown in FIG. 7 as viewed from the back side;

FIG. 11 is an exploded isometric view of the control module housing shown in FIG. 10;

FIG. 12 is an exploded isometric view of the control module housing shown in FIG. 10 as viewed from underneath.

Figure 1:
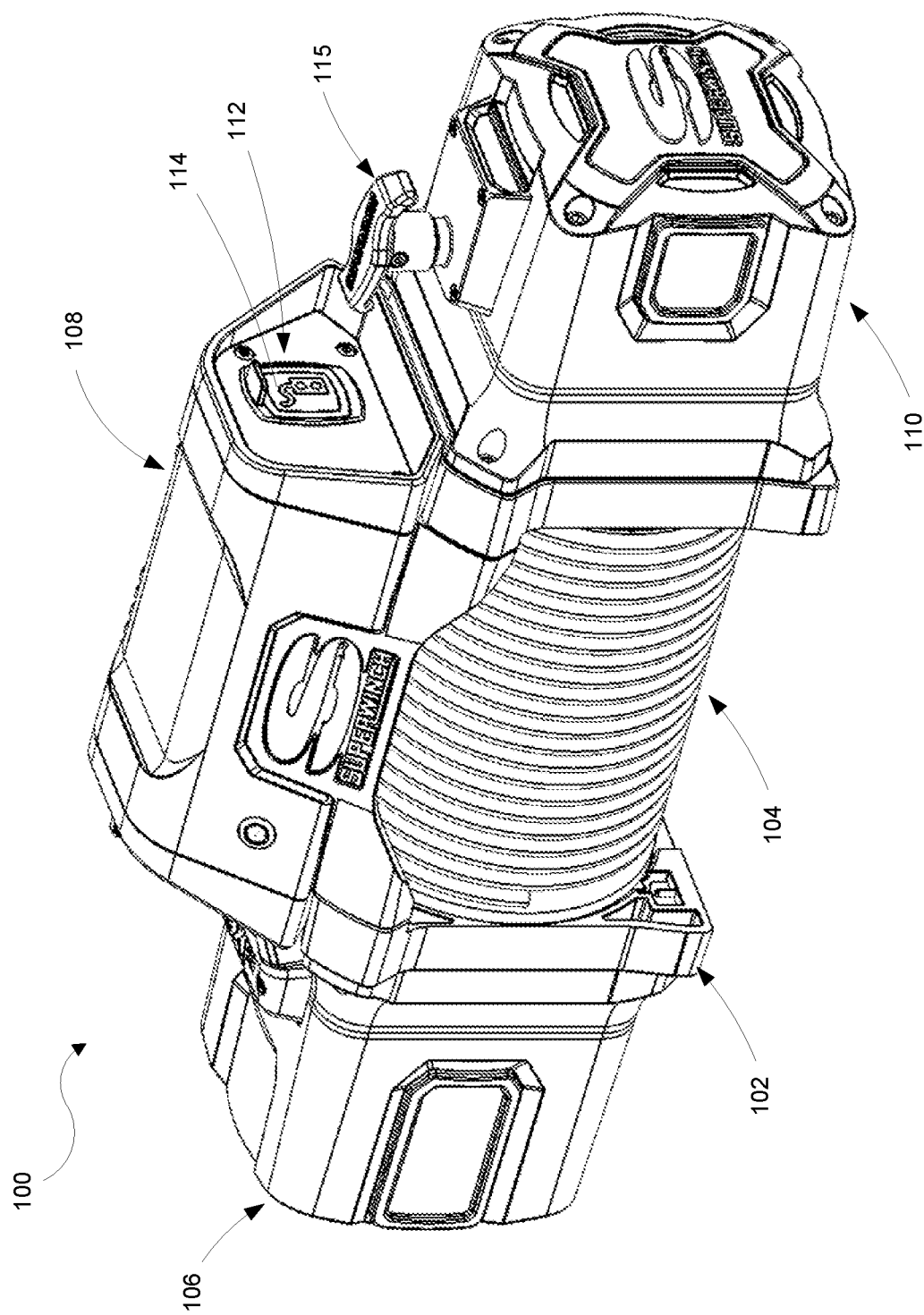
FIG. 1 is an isometric view of a winch with integrated lighting in accordance with some embodiments of the present technology, as viewed from the right side.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and/or alternatives of the technology falling within the scope of this disclosure.

DETAILED DESCRIPTION

Overview

In some embodiments, the disclosed winches with integrated lighting can include a frame assembly, a cable drum rotatably supported by the frame assembly, a drive motor operatively connected to the cable drum, and an electrical module positioned adjacent the cable drum. The electrical module can include a housing with an elongate light guide mounted to the housing between the housing and the cable drum. One or more light emitting diodes (LEDs) can be positioned to illuminate the light guide. In some embodiments, the electrical module can include an auxiliary power port including an annular light guide positioned around the power port and one or more LEDs positioned to illuminate the annular light guide. In some embodiments, the electrical module can include a remote control connector and a removable protective boot. The protective boot can include a light guide frame positioned on an outward facing surface of the boot. One or more LEDs can be positioned to illuminate the light guide frame when the boot is in position to cover the remote control connector.

General Description

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures and/or functions may not be shown or described in detail below so as to avoid unnecessarily obscuring the relevant description.

FIG. 1 illustrates a winch 100 having integrated lighting. The winch 100 can include a frame assembly 102 that supports a drive motor 106 which powers a cable drum 104. The drive motor 106 drives the drum 104 through a gear train assembly 110. A clutch mechanism 115 engages and disengages the drum 104 from the gear train assembly 110 to facilitate quickly and easily unwinding the cable from the drum 104. An electrical module, such as a winch control module 108 can span across the cable drum 104 and houses control circuitry for the winch 100. The control module 108 can include various illuminated features. For example, in some embodiments, the control module 108 can include an illuminated remote control connector assembly 112 with a protective boot 114. The boot 114 can be removed to connect a remote winch controller (not shown) to the control module 108.

Figure 2:
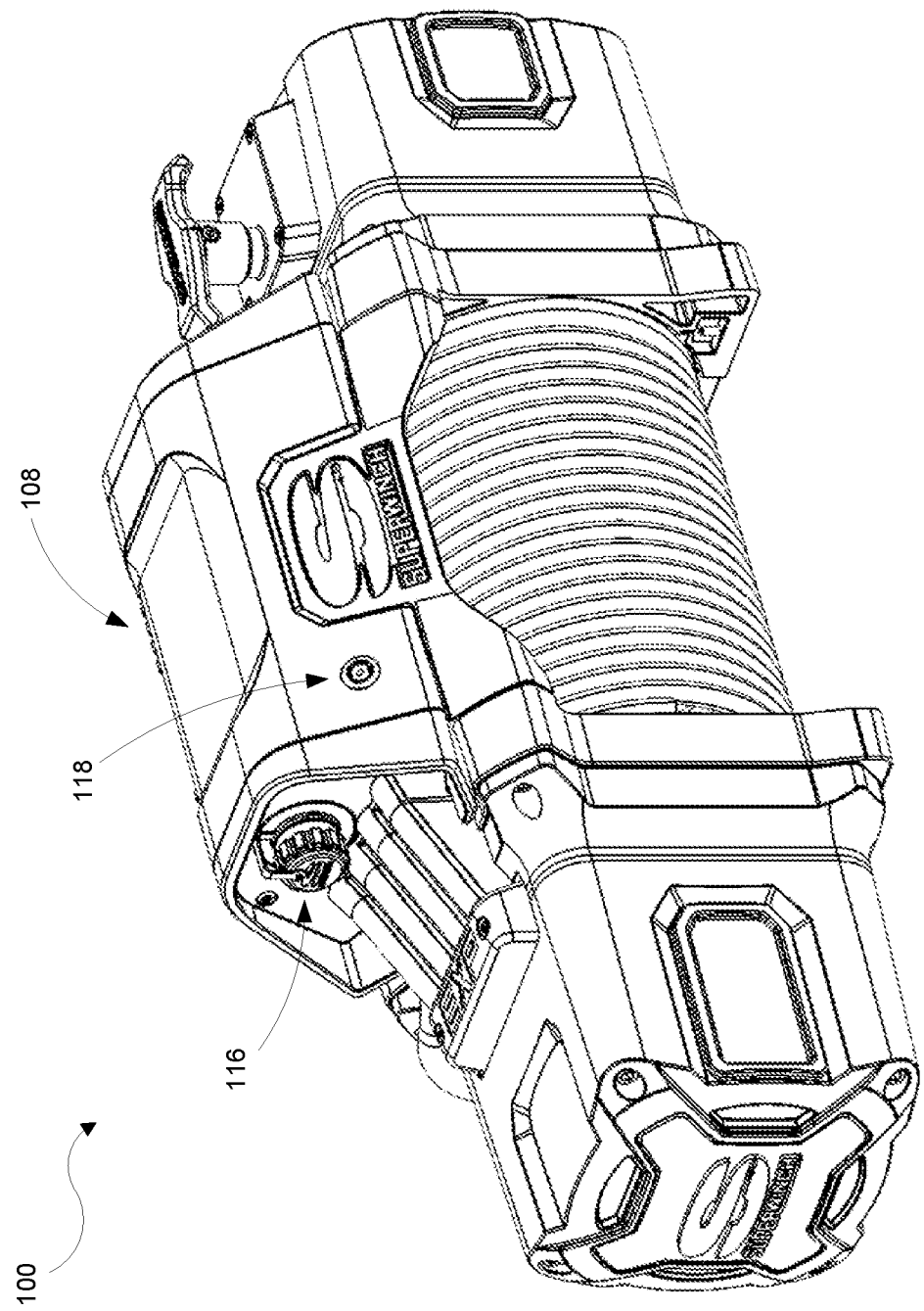
FIG. 2 is an isometric view of the winch shown in FIG. 1 as viewed from the left side.
Figure 3:
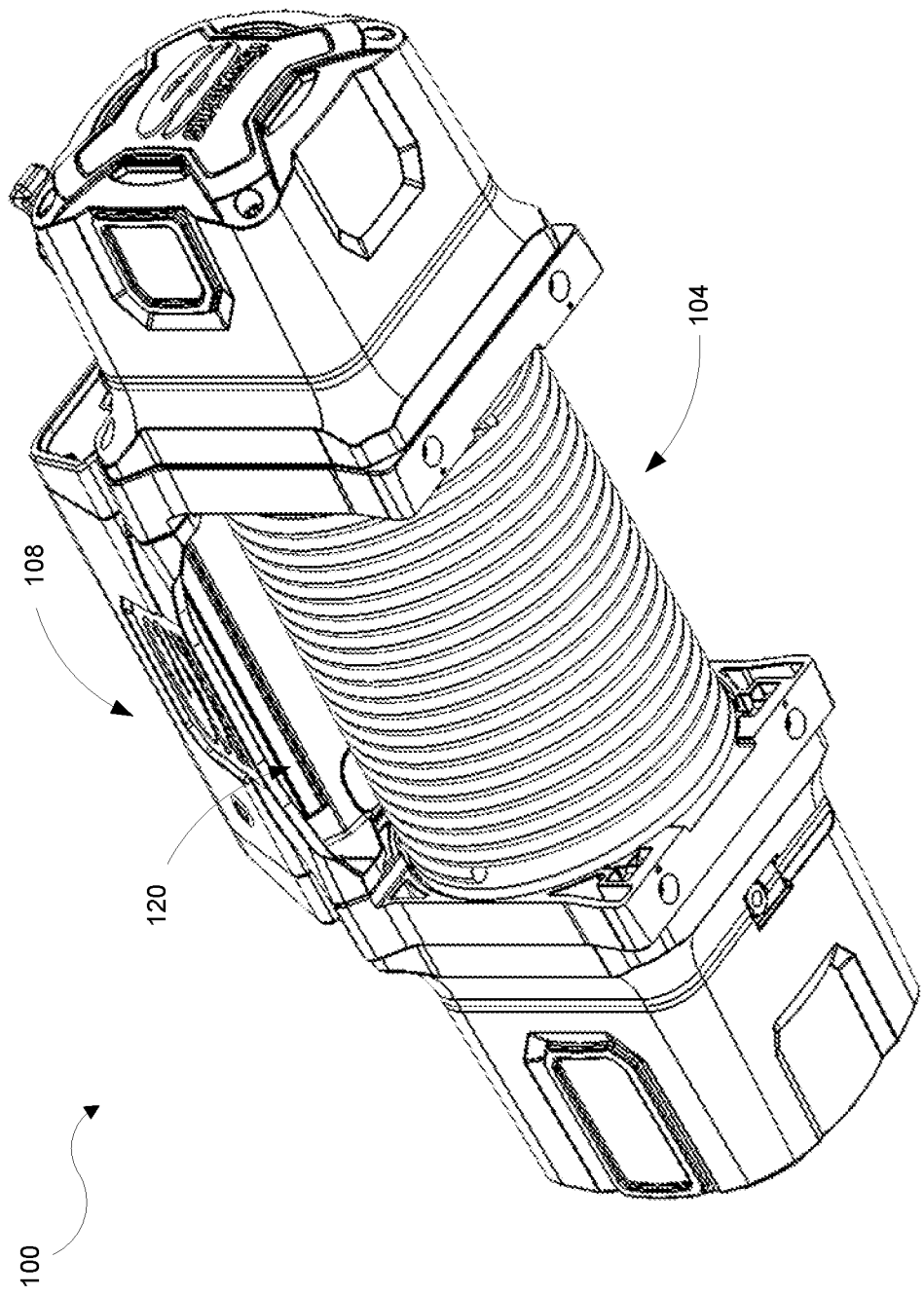
FIG. 3 is an isometric view of the winch shown in FIGS. 1 and 2 as viewed from underneath.

With reference to FIG. 2, the control module 108 can include one or more illuminated power ports 116. The power ports 116 can provide power to auxiliary equipment such as spot lights and/or air compressors (not shown), for example. In some embodiments, the control module 108 can include an indicator assembly 118 including an indicator light, such as a tri-color light emitting diode (LED), to indicate a status of the winch (e.g., motor current draw). With reference to FIG. 3, the control module 108 can also include a drum light assembly 120 positioned between the control module 108 and the cable drum 104 to illuminate the cable drum 104.

Figure 4:
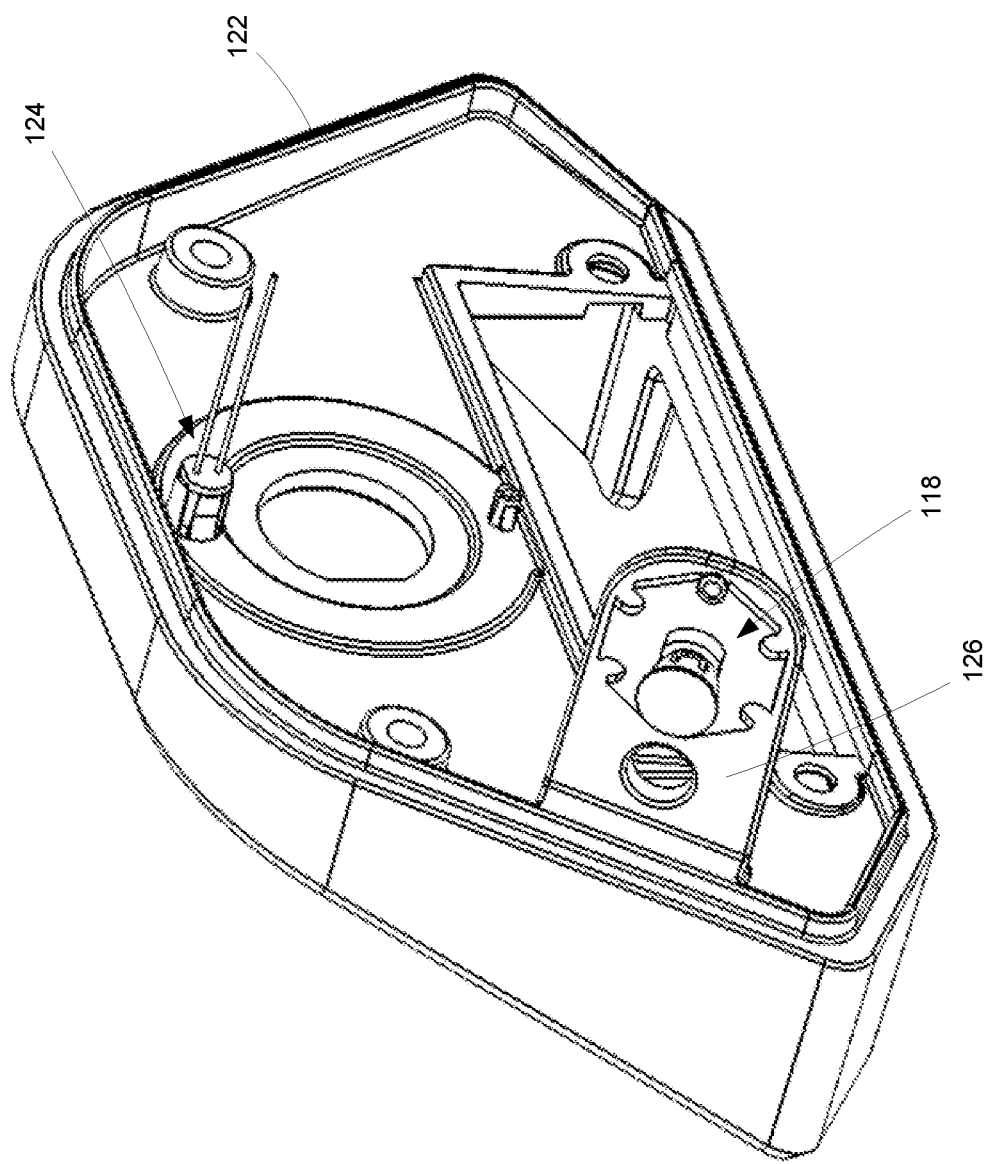
FIG. 4 is an isometric view of a left side end cap assembly in accordance with some embodiments of the present technology.

FIG. 4 illustrates a first endcap 122 of the control module 108 (FIG. 2) which supports the power port 116 (FIG. 2) and an associated annular light guide assembly 124. In some embodiments, the first end cap 122 also supports the indicator assembly 118 (also shown in FIG. 2) on a mounting tab 126.

With further reference to FIGS. 5 and 6, the indicator assembly 118 can include a tri-color LED 134 mounted to the mounting tab 126, and an indicator lens 136 covering the tri-color LED. The annular light guide assembly 124 can include an annular light guide 128 including one or more sockets 130 and an attachment post 132. The socket 130 is adapted to receive a light source from one or more sources, such as a power port LED 138. The annular light guide 128 can comprise a light guide, light pipe, or lens material, such as a clear, transparent, and/or translucent plastic material, for example. Accordingly, light emitted from the LED 138 is distributed around the annular light guide 128 to illuminate the power port 116 (FIG. 2). Multiple light sources can be used to provide a more even distribution of light intensity.

The end cap 122 can include an annular groove 140, shown in FIG. 6, configured to receive the light guide 128 such that the light guide 128 is flush with an end cap surface 123. A socket aperture 142 and a post aperture 144 can be formed in the groove 140 to receive the socket 130 and the attachment post 132 (shown in FIG. 5). The socket 130 and the attachment post 132 each include one or more barbs 131 and 133 (FIG. 5), respectively, to retain the light guide 128 in the groove 140.

Figure 7:
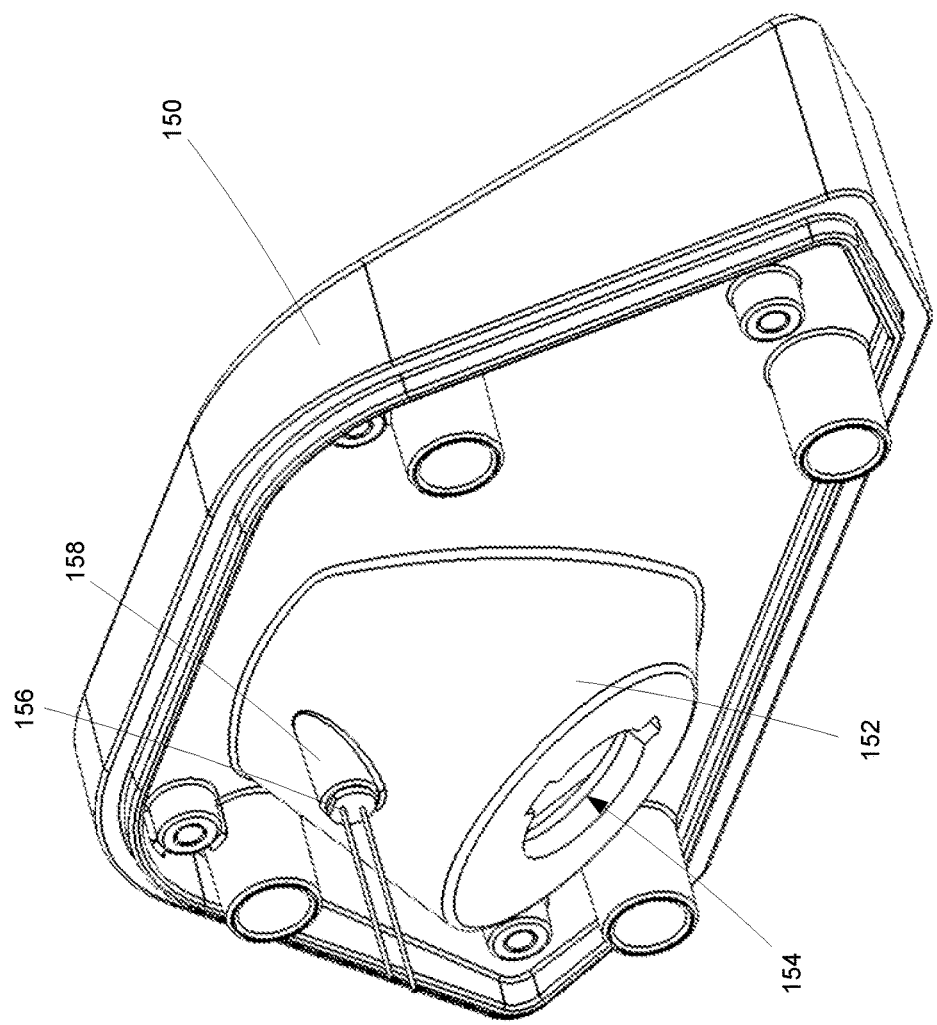
FIG. 7 is an isometric view of a right side end cap assembly in accordance with some embodiments of the present technology.

FIG. 7 illustrates a second endcap 150 of the control module 108 (FIG. 2) which supports the remote control connector assembly 112 (FIG. 1). The second endcap 150 can include a connector recess 152 with a connector opening 154 to receive a remote control connector (not shown). The remote control connector assembly 112 is illuminated by one or more light sources, such as a connector LED 156 positioned in a socket 158. With further reference to FIGS. 8 and 9, the connector recess 152 is configured to receive the protective boot 114. The boot 114 can include a groove 162 configured to receive a light guide 170. The boot 114 can include apertures 164 and 166 to receive a pair of attachment posts 174 and 176 (FIG. 9) extending from the light guide 170.

When the boot 114 is installed in the connector recess 152, light emitted from the connector LED 156 travels through the socket 158, through the aperture 164, and into the attachment post 174 to illuminate the light guide 170. With reference to FIG. 8, when the boot 114 is removed from the connector recess 152 (to allow connection to a connector positioned in the socket 158), light from the connector LED 156 shines into the area of the recess 152 to illuminate the connector (not shown).

Figure 10:
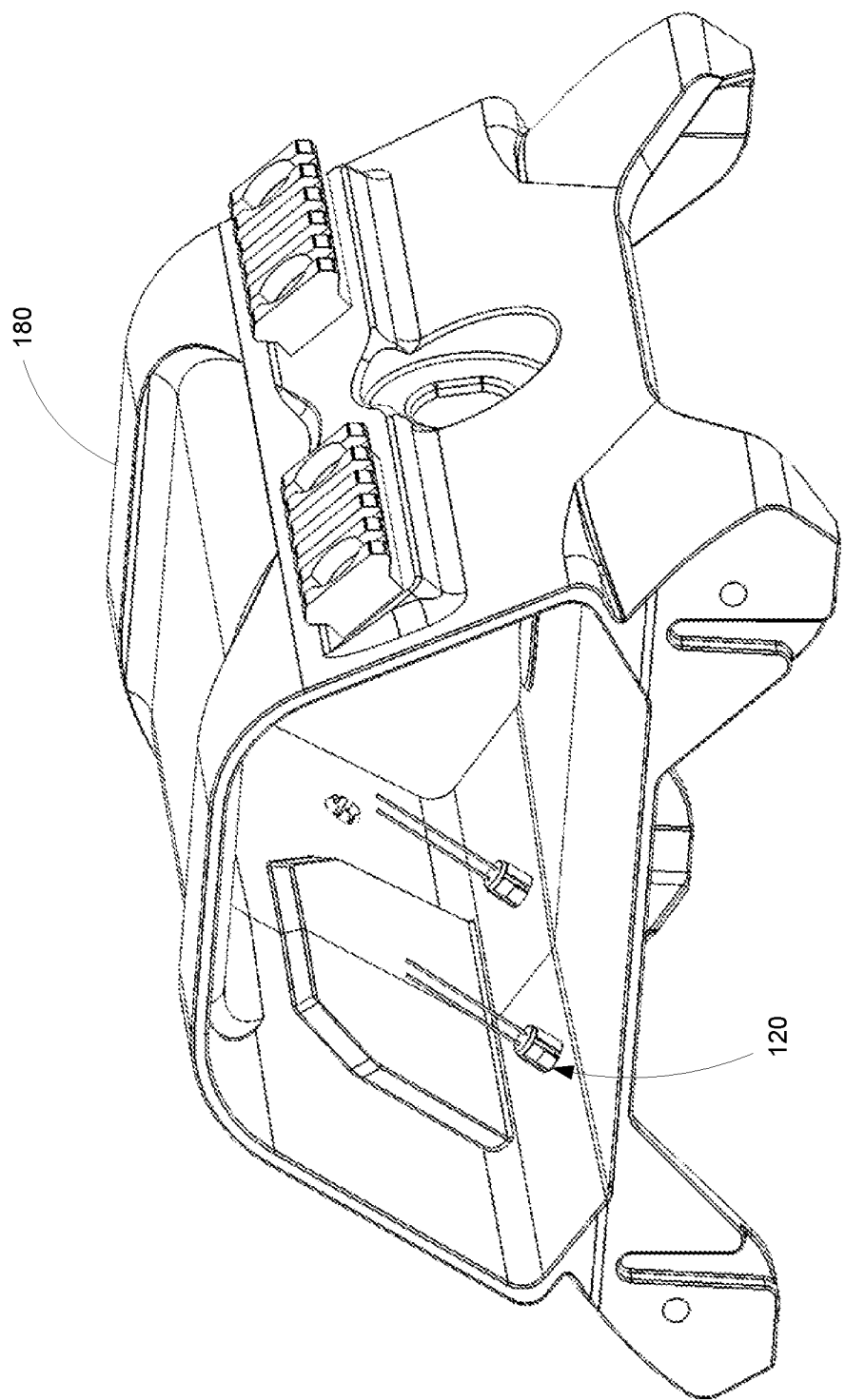
FIG. 10 is an isometric interior view of the control module housing configured in accordance with some embodiments of the present technology.

As shown in FIGS. 10-12, the control module housing 180 supports the drum light assembly 120. As shown in FIG. 11, the drum light assembly 120 can include an elongate light guide 182 and one or more light sources, such as drum LEDs 186. The elongate light guide 182 can include a pair of sockets 184 extending from the light guide 182 and configured to receive the drum LEDs 186. As shown in FIG. 12, the housing 180 can include an elongate groove 188 corresponding to (e.g., sized and shaped to receive) the light guide 182. One or more apertures 190 can be formed in the groove 188 to receive the sockets 184, thereby retaining the light guide 182 in the groove 188.

The indicator LED 134, power port LED 138, connector LED 156, and drum light LEDs 186 described above can all be powered via the winch with a suitable electrical power supply, such as a vehicle's battery. The lights can be controlled as desired with suitable electronic controls housed in the control module 108, for example. In some embodiments, the lighting can be activated by tying into the vehicle's lighting system or through a separate switch.

One feature of winches with integrated lighting having configurations in accordance with the embodiments described above is that selected portions of the winch can be illuminated to facilitate operating and connecting controls and auxiliary equipment to the winch. An advantage of this arrangement is that an operator can carefully monitor the winch, particularly the cable drum, in low light conditions, where it would otherwise be difficult for the operator to see the cable or rope as it winds onto the cable drum. Having integrated lighting on the winch to illuminate the cable drum, power ports, and/or remote connector is much more convenient than having to hold a light source (e.g., a flashlight). Furthermore, a flashlight is not always available, and holding a flashlight occupies one of the user's hands that would otherwise be available for performing winching operations.

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term.

Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

In some embodiments, a representative winch with integrated lighting comprises a frame assembly; a cable drum rotatably supported in the frame assembly; a drive motor operatively connected to the cable drum; and an electrical module positioned adjacent the cable drum, the electrical module including a light source positioned to illuminate the cable drum.

In some embodiments, a representative winch with integrated lighting comprises a frame assembly; a cable drum rotatably supported in the frame assembly; a drive motor operatively connected to the cable drum; and an electrical module positioned adjacent the cable drum, the electrical module including a housing; an elongate light guide mounted to the housing between the housing and the cable drum; and one or more light emitting diodes (LEDs) positioned to illuminate the light guide. In some embodiments, the electrical module can include an auxiliary power port including an annular light guide positioned around the power port and one or more LEDs positioned to illuminate the annular light guide. In some embodiments, the electrical module can include a remote control connector and a removable protective boot. The protective boot can include a light guide frame positioned on an outward facing surface of the boot. One or more LEDs can be positioned to illuminate the light guide frame when the boot is in position to cover the remote control connector.

In some embodiments, a representative method of illuminating a winch can include positioning one or more light sources on the winch and directing light emitted by the one or more light sources to illuminate at least a portion of a cable drum carried by the winch. In some embodiments, selected ones of the one or more light sources can be directed to illuminate other portions of the winch such as a power port, a remote control connector, a winch drum, and/or a winch clutch handle. In some embodiments, the method can include connecting the light source to an electrical connection within a housing of the winch. In some embodiments, the one or more light sources is not supported by a user. In some embodiments, the one or more light sources is not a handheld light source. In some embodiments, the method can include positioning an elongate light guide proximate the one or more light sources to direct the light emitted by the one or more light sources to illuminate at least a portion of the cable drum.

The following examples provide additional embodiments of the present technology.

EXAMPLES

1. A winch with integrated lighting, comprising:
a frame;
a cable drum rotatably supported by the frame;
a drive motor operatively connected to the cable drum;
an electrical module carried by the frame; and
a drum light source carried by the electrical module to illuminate at least a portion of the cable drum.

2. The winch of example 1, further comprising an auxiliary power port carried by the electrical module and a power port light source carried by the electrical module to illuminate at least a portion of the power port.

3. The winch of example 1 or 2, further comprising a remote control connector carried by the electrical module and a connector light source carried by the electrical module to illuminate at least a portion of the remote control connector.

4. The winch of any one of examples 1-3, wherein the drum light source comprises one or more light emitting diodes.

5. A winch with integrated lighting, comprising:
a frame;
a cable drum rotatably supported by the frame;
a drive motor operatively connected to the cable drum; and
an electrical module, including:
a housing;
first and second end caps coupled to the housing;
an elongate light guide mounted to the housing between the housing and the cable drum; and
one or more drum light sources connected to the elongate light guide.

6. The winch of example 5, wherein the elongate light guide includes a pair of sockets extending from the light guide and positioned to receive a corresponding pair of drum light sources.

7. The winch of example 5 or 6, wherein the housing includes a groove corresponding to the elongate light guide and a pair of apertures positioned in the groove to receive the pair of sockets, thereby retaining the light guide in the groove.

8. The winch of any one of examples 5-7, further comprising an auxiliary power port carried by the electrical module and including an annular light guide positioned around the power port and one or more power port light sources positioned to illuminate the annular light guide.

9. The winch of any one of examples 5-8, wherein the auxiliary power port is supported by the first end cap.

10. The winch of any one of examples 5-9, further comprising a remote control connector carried by the electrical module and one or more connector light sources carried by the electrical module to illuminate at least a portion of the remote control connector.

11. The winch of any one of examples 5-10, wherein the remote control connector is supported by the second end cap in a connector recess.

12. The winch of any one of examples 5-11, further comprising a removable protective boot positioned in the connector recess to cover the remote control connector.

13. The winch of any one of examples 5-12, wherein the protective boot includes a light guide frame positioned on an outward facing surface of the protective boot, wherein the light guide frame includes one or more attachment posts positioned to receive light from the connector light source when the boot is positioned in the connector recess.

14. A winch with integrated lighting, comprising:
a frame;
a cable drum rotatably supported by the frame;
a drive motor operatively connected to the cable drum; and
an electrical module, including:
an elongate light guide having one or more sockets extending from the light guide;
one or more drum light sources each positioned in a corresponding socket;
a housing including a groove corresponding to the elongate light guide and one or more apertures positioned in the groove to receive a corresponding socket to retain the light guide in the groove;

an auxiliary power port carried by the electrical module; and a power port light source carried by the electrical module to illuminate at least a portion of the power port.

15. The winch of example 14, wherein the light guide is positioned between the housing and the cable drum.

16. The winch of example 14 or 15, further comprising a power port light guide positioned around the auxiliary power port.

17. The winch of any one of examples 14-16, further comprising first and second end caps coupled to the housing, and wherein the auxiliary power port is supported by the first end cap.

18. The winch of any one of examples 14-17, further comprising a remote control connector positioned on the electrical module and one or more connector light sources positioned on the electrical module to illuminate the remote control connector.

19. The winch of any one of examples 14-18, wherein the remote control connector is supported by the second end cap in a connector recess.

20. The winch of any one of examples 14-19, further comprising a removable protective boot positioned in the connector recess to cover the remote control connector, wherein the protective boot includes a light guide frame positioned on an outward facing surface of the protective boot, wherein the light guide frame includes one or more attachment posts positioned to receive light from the connector light source when the boot is positioned in the connector recess.

21. A method of illuminating a winch, the method comprising:

positioning one or more light sources on the winch;

directing light emitted by the one or more light sources to illuminate at least a portion of a cable drum carried by the winch; and connecting the light source to an electrical connection within a housing of the winch.

22. The method of example 21, wherein the one or more light sources is not supported by a user.

23. The method of example 21 or 22, wherein the one or more light sources is not a handheld light source.

24. The method of any one of examples 21-23, further comprising positioning an elongate light guide proximate the one or more light sources to direct the light emitted by the one or more light sources to illuminate at least a portion of the cable drum.

What is claimed is:

1. A winch with integrated lighting, comprising: a frame; a cable drum rotatably supported by the frame;
a drive motor operatively connected to the cable drum; an electrical module carried by the frame; and
a drum light source carried by the electrical module to illuminate at least a portion of the cable drum thereby allowing a user to see in a low light condition, interaction between a cable or a rope and the cable drum without requiring another light source to illuminate the at least a portion of the cable drum.

2. The winch of claim 1, further comprising an auxiliary power port carried by the electrical module and a power port light source carried by the electrical module to illuminate at least a portion of the power port.

3. The winch of claim 1, further comprising a remote control connector carried by the electrical module and a connector light source carried by the electrical module to illuminate at least a portion of the remote control connector.

4. The winch of claim 1, wherein the drum light source comprises one or more light emitting diodes.

5. A winch with integrated lighting, comprising: a frame; a cable drum rotatably supported by the frame;
a drive motor operatively connected to the cable drum; and
an electrical module, including:
a housing;
first and second end caps coupled to the housing;
an elongate light guide mounted to the housing between the housing and the cable drum; and
one or more drum light sources connected to the elongate light guide wherein the one or more drum light sources illuminate at least a portion of the cable drum thereby allowing a user to see in a low light condition, interaction between a cable or a rope and the cable drum without requiring another light source to illuminate the at least one portion of the cable drum.

6. The winch of claim 5, wherein the elongate light guide includes a pair of sockets extending from the light guide and positioned to receive a corresponding pair of drum light sources.

7. The winch of claim 6, wherein the housing includes a groove corresponding to the elongate light guide and a pair of apertures positioned in the groove to receive the pair of sockets, thereby retaining the light guide in the groove.

8. The winch of claim 5, further comprising an auxiliary power port carried by the electrical module and including an annular light guide positioned around the power port and one or more power port light sources positioned to illuminate the annular light guide.

9. The winch of claim 8, wherein the auxiliary power port is supported by the first end cap.

10. The winch of claim 8, further comprising a remote control connector carried by the electrical module and one or more connector light sources carried by the electrical module to illuminate at least a portion of the remote control connector.

11. The winch of claim 10, wherein the remote control connector is supported by the second end cap in a connector recess.

12. The winch of claim 11, further comprising a removable protective boot positioned in the connector recess to cover the remote control connector.

13. The winch of claim 12, wherein the protective boot includes a light guide frame positioned on an outward facing surface of the protective boot, wherein the light guide frame includes one or more attachment posts positioned to receive light from the connector light source when the boot 1s positioned in the connector recess.

14. A winch with integrated lighting, comprising: a frame; a cable drum rotatably supported by the frame;
a drive motor operatively connected to the cable drum; and
an electrical module, including:
an elongate light guide having one or more sockets extending from the light guide;
one or more drum light sources each positioned in a corresponding socket;
a housing including a groove corresponding to the elongate light guide and one or more apertures positioned in the groove to receive a corresponding socket to retain the light guide in the groove;
an auxiliary power port carried by the electrical module; and
a power port light source carried by the electrical module to illuminate at least a portion of the power port.

15. The winch of claim 14, wherein the light guide is positioned between the housing and the cable drum.

16. The winch of claim 14, further comprising a power port light guide positioned around the auxiliary power port.

17. The winch of claim 16, further comprising first and second end caps coupled to the housing, and wherein the auxiliary power port is supported by the first end cap.

18. The winch of claim 17, further comprising a remote control connector positioned on the electrical module and one or more connector light sources positioned on the electrical module to illuminate the remote control connector.

19. The winch of claim 18, wherein the remote control connector is supported by the second end cap in a connector recess.

20. The winch of claim 19, further comprising a removable protective boot positioned in the connector recess to cover the remote control connector, wherein the protective boot includes a light guide frame positioned on an outward facing surface of the protective boot, wherein the light guide frame includes one or more attachment posts positioned to receive light from the connector light source when the boot is positioned in the connector recess.

21. A method of illuminating a winch, the method comprising:
   a) providing the winch comprising: a frame; a cable drum rotatably supported by the frame; a drive motor operatively connected to the cable drum; an electrical module carried by the frame; and one or more light sources carried by the electrical module to illuminate at least a portion of the cable drum;
   b) positioning the one or more light sources on the winch; directing light emitted by the one or more light sources to illuminate at least a portion of a cable drum carried by the winch thereby allowing a user to see in a low light condition, interaction between a cable or a rope and the cable drum without requiring another light source to illuminate the at least a portion of the cable drum.

22. The method of claim 21, wherein the one or more light sources is not supported by a user.

23. The method of claim 22, wherein the one or more light sources is not a handheld light source.

24. The method of claim 21, further comprising positioning an elongate light guide proximate the one or more light sources to direct the light emitted by the one or more light sources to illuminate the at least a portion of the cable drum.

* * * * *